2,773,098

PREPARATION OF N,N'-DIBENZYLETHYLENE-DIAMINE

Melvin A. Rebenstorf, Kalamazoo, Mich., assignor to The Upjohn Company, Kalamazoo, Mich., a corporation of Michigan No Drawing. Application August 28, 1952, Serial No. 306,968

3 Claims. (Cl. 260—570.9)

This invention relates to amines and, more specifically, to an improvement in the synthesis of N,N'-dibenzylethylenediamine.

It has recently been found that N,N'-dibenzylethylenediamine penicillin is characterized by highly-desirable and unusual properties such as, for example, substantial insolubility in water and body fluids, excellent stability and non-toxicity. This penicillin salt is also substantially tasteless. Further, it has been found that this therapeutic material, upon injection into the body or upon oral administration thereof, provides a supply of penicillin which is very slowly absorbed and will therefore maintain effective blood levels of penicillin for prolonged periods which have been hitherto unobtainable. Still another outstanding property of the penicillin salt of N,N'-dibenzylethylenediamine is that it produces substantially no side effects or irritation upon administration.

The penicillin salt of N,N'-dibenzylethylenediamine may be conveniently prepared by directly combining N,N'-dibenzylethylenediamine with penicillin in an inert organic solvent medium, such as ether or chloroform, and subsequently recovering the penicillin salt thus-formed.

The preferred method, however, for the preparation of the penicillin salt of N,N'-dibenzylethylenediamine is by a metathesis reaction wherein a water-soluble salt of penicillin is reacted with a water-soluble salt of N,N'-dibenzylethylenediamine in a solvent medium, preferably in an aqueous medium, followed by a recovery of the resulting highly-insoluble penicillin salt of the N,N'-dibenzylethylenediamine.

The simplest and most direct method for the preparation of N,N'-dibenzylethylenediamine, the starting material used in the preparation of N,N'-dibenzylethylenediamine penicillin, is by the reduction of N,N'-dibenzalethylenediamine. Several procedures, amply detailed in the literature, have been hitherto employed for the reduction of N,N'-dibenzalethylenediamine to N,N'-dibenzylethylenediamine. For example, in a typical method disclosed by Szabo et al., Antibiotics and Chemotherapy, 1, 499–503 (1951), a solution of N,N'-dibenzalethylenediamine in methanol was catalytically hydrogenated at 300 pounds pressure per square inch in the presence of platinum oxide. However, in addition to the N,N'-dibenzylethylenediamine thus-formed, and inter-mixed therewith, a considerable amount of a crystalline by-product, identified as 1,3-dibenzyl-2-phenyl-tetrahydroimidazole, was also obtained. In order to isolate the desired N,N'-dibenzylethylenediamine from this mixture of reaction products, further treatment and purification was necessary, thereby increasing the number of steps in the process with concomitant decrease in yield of the desired N,N'-dibenzylethylenediamine. Using another method described by Lob., Rec. Trav. Chim. 55, 859–73 (1936), N,N'-dibenzalethylenediamine was reduced to N,N'-dibenzylethylenediamine by a mixture of sodium and alcohol, in which process a by-product, 1,3-dibenzyl-2-phenylimidazoline, was also obtained. Other disadvantages associated with the use of this process were the large volumes of alcohol required and the unsuitability of the method for large-scale use. Until the present time, attempts to reduce N,N'-dibenzalethylenediamine to obtain N,N'-dibenzylethylenediamine, substantially-free from reaction by-products and in high yield, have been unsuccessful.

Accordingly, it is an object of the present invention to provide a new and improved method for the preparation of N,N'-dibenzylethylenediamine. It is a further object of this invention to provide a simple process, adaptable to large-scale production, for the reduction of N,N'-dibenzalethylenediamine to N,N'-dibenzylethylenediamine. Another object of this invention is to provide a process for the production of substantially pure N,N'-dibenzylethylenediamine whereby the yield obtained from a given quantity of N,N'-dibenzalethylenediamine is greatly increased over that obtainable by known methods. Other objects and features of the invention will be apparent to those skilled in the art to which this invention pertains.

The foregoing and additional objects of the invention are accomplished by dissolving N,N'-dibenzalethylenediamine in a lower-alkyl acetate and then subjecting the resulting solution to reduction with hydrogen in the presence of a hydrogenation catalyst, to obtain N,N'-dibenzylethylenediamine in high yield. The product thus-obtained is substantially free from reaction by-products and is directly convertible to its acid salts without the usual purification and isolation procedures. The acid salts, in turn, are utilized in the preparation of the highly-valuable penicillin salts of N,N'-dibenzylethylenediamine.

In a more specific and preferred embodiment of this invention, N,N'-dibenzalethylenediamine is dissolved in a lower-alkyl acetate such as, for example, ethyl acetate, and the resulting solution placed in a stirring-type hydrogenator. Representative lower-alkyl acetates which may be used as solvents include the methyl, ethyl, propyl, isopropyl, butyl, isobutyl and amyl acetates, with lower-alkyl acetates containing up to and including five carbon atoms in the alkyl group, and especially ethyl and amyl acetate, being preferred. The hydrogenation is carried out by the use of hydrogen under pressure and in the presence of a suitable hydrogenation catalyst. While platinum oxide is considered to be the preferred hydrogenation catalyst, catalysts such as palladium, palladium on carbon, platinum on carbon, platinum on alumina, and the like, may also be used. The pressure during the hydrogenation reaction is usually maintained between about 25 and about 75 pounds per square inch and preferably at about fifty pounds per square inch. Although satisfactory results are obtained when the temperature of the reduction step is between about fifteen and about sixty degrees centigrade, the preferred temperature is about room temperature, e. g., between about twenty and 25 degrees centigrade. When the hydrogenation is substantially complete, as evidenced by the extent of hydrogen up-take, i. e., between about ninety to about 100 percent of the theoretical two moles of hydrogen per mole of starting N,N'-dibenzalethylenediamine, the bomb is purged with nitrogen, emptied, and a further amount of ethyl acetate is added to the mixture. The catalyst is then removed by filtration, ethyl acetate separated from the mixture by distillation, and the hydrogenated material isolated by fractional distillation under vacuum. Yields exceeding ninety percent of the substantially pure N,N'-dibenzylethylenediamine are obtained by this procedure.

The N,N'-dibenzylethylenediamine thus-obtained can be converted to a water-soluble salt, such as N,N'-dibenzylethylenediamine diacetate, N,N'-dibenzylethylenediamine dihydrochloride, or the like, by directly reacting the amine base with a suitable acid. The water-soluble acid salt of N,N'-dibenzylethylenediamine thus-formed may be converted to the desired N,N'-dibenzylethylenediamine penicillin by dissolving in an aqueous medium and adding an aqueous solution of a selected penicillin salt thereto. The resulting penicillin salt of N,N'-dibenzylethylenediamine is substantially insoluble in water and precipitates from the aqueous solution.

As a practical matter, it is unnecessary to separate the N,N'-dibenzylethylenediamine from the hydrogenation reaction mixture for conversion to its acid salt. The hydrogenation catalyst may be removed from the reaction product and the selected acid added directly thereto, thereby forming the desired acid salt of N,N'-dibenzylethylenediamine.

The following preparation and examples are given to illustrate the practice of the present invention, but are in no way to be construed as limiting.

PREPARATION.—N,N'-DIBENZALETHYLENEDIAMINE

To sixty grams (one mole) of ethylenediamine in a two-liter, three-neck, round-bottom flask equipped with stirrer, reflux condenser, and dropping funnel, 212 grams (two moles) of chlorine-free benzaldehyde was slowly added with stirring. Before the addition of the benzaldehyde was substantially complete, the reaction mixture became cloudy. The addition of benzaldehyde to the ethylenediamine was completed within about thirty minutes, the temperature of the mixture during the addition rising to about seventy degrees centigrade. The mixture was stirred for an additional period of about ten minutes. Two hundred milliliters of thiophene-free benzene was added and the mixture externally cooled to about room temperature. At this point, a layer of about 31 milliliters of water separated out of the mixture and was removed. The remainder of the water was removed, together with the benzene, by azeotropic distillation. Fifty milliliters of thiophene-free benzene was added to the residue and the benzene then removed by vacuum distillation, which was continued until no further material boiled over at steam bath temperature and at a pressure of about fifteen milliliters of mercury. On drying the oily residue, 235 grams of a yellow crystalline material, having a melting point between 51 and 53 degrees centigrade and identified as N,N'-dibenzalethylenediamine, was obtained.

*Example 1.—N,N'-dibenzylethylenediamine*

One mole (236.9 grams) of N,N'-dibenzalethylenediamine was dissolved in 236 milliliters of ethyl acetate and the solution placed, together with two grams of platinum oxide, in a one-liter stirring-type hydrogenator. The hydrogenation was carried out at a temperature between twenty and 25 degrees centigrade and under a hydrogen pressure of about fifty pounds per square inch. After seven hours, the bomb was purged with nitrogen, emptied and about 250 milliliters of ethyl acetate added to the product. Platinum oxide was separated from the product by filtration. The ethyl acetate fraction was removed by distillation and the resulting clear light yellow solution subjected to further distillation under vacuum. The fraction boiling between 184 and 186 degrees centigrade at a pressure of 2.1 millimeters of mercury was collected and dried. Two hundred and twenty-three grams (93 percent yield) of a white solid, identified as N,N'-dibenzylethylenediamine, was obtained.

*Example 2.—N,N'-dibenzylethylenediamine*

One mole (236.9 grams) of N,N'-dibenzalethylenediamine was dissolved in about 250 milliliters of amyl acetate and the solution placed, together with two grams of ten percent palladium on carbon, in a one-liter stirring-type hydrogenator. The hydrogenation was carried out at a temperature between forty and 45 degrees centigrade and under a hydrogen pressure of about 35 pounds per square inch. After eight and one-half hours, the bomb was purged with nitrogen, emptied and 200 milliliters of amyl acetate added to the mixture. The catalyst was separated from the mixture by filtration. The amyl acetate fraction was removed by distillation and the resulting clear light yellow solution subjected to further distillation under vacuum. The fraction boiling over between 184 and 186 degrees centigrade at a pressure of 2.1 millimeters of mercury was collected and dried. Two hundred and sixteen grams (ninety percent yield) of a white solid, identified as N,N'-dibenzylethylenediamine, was obtained.

The results of Examples 1 and 2 may also be attained using other lower-alkyl acetates as solvent, such as methyl, propyl, isopropyl, butyl, isobutyl, or like lower-alkyl acetates.

*Example 3.—N,N'-dibenzylethylenediamine diacetate*

Two hundred and twenty-three grams of N,N'-dibenzylethylenediamine, produced in either Example 1 or 2 above, was dissolved in 400 milliliters of ethyl acetate and the solution diluted to a total volume of 2250 milliliters by the addition of further amounts of ethyl acetate. The resulting solution was slowly heated, with stirring, until a temperature of about seventy degrees centigrade was reached. At this point, 132 grams of glacial acetic acid was slowly added thereto, the temperature of the resulting mixture being maintained between seventy and 75 degrees centigrade during the addition. The mixture was stirred for an additional thirty minutes and then allowed to cool slowly to room temperature. During this cooling period, a solid material began to settle from the solution. The mixture was refrigerated overnight. The solid material that had separated from the solution was removed by vacuum filtration and washed with about 500 milliliters of ethyl acetate. After drying in a vacuum oven at sixty degrees centigrade for four hours, 317 grams (95 percent yield) of N,N'-dibenzylethylenediamine diacetate, melting at 112 to 115 degrees centigrade, was obtained in the form of white needles.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. In a process for the production of N,N'-dibenzylethylenediamine by the catalytic hydrogenation of N,N'-dibenzalethylenediamine, the improvement which comprises conducting the reduction of said N,N'-dibenzalethylenediamine in a solution of a lower-alkyl acetate.

2. The procedure of claim 1 wherein the lower-alkyl acetate is ethyl acetate.

3. The procedure of claim 1 wherein the lower-alkyl acetate is amyl acetate.

References Cited in the file of this patent

UNITED STATES PATENTS

| | | |
|---|---|---|
| 2,582,292 | Sondern et al. | Jan. 15, 1952 |
| 2,627,491 | Szabo et al. | Feb. 3, 1953 |

OTHER REFERENCES

Szabo et al.: "Antibiotics and Chemotherapy" (1951), vol. 1, pp. 499–503.

Lob: "Chem. Abst." (1937), vol. 31, p. 1385.